United States Patent [19]

Peterson

[11] Patent Number: 4,850,267
[45] Date of Patent: Jul. 25, 1989

[54] WIND DIVERTER FOR VENTILATOR FANS

[75] Inventor: Vincent E. Peterson, Glenwood, Minn.

[73] Assignee: Osborne Industries, Inc., Osborne, Kans.

[21] Appl. No.: 270,463

[22] Filed: Nov. 9, 1988

Related U.S. Application Data

[63] Continuation of Ser. No. 734,046, May 10, 1985, abandoned.

[51] Int. Cl.⁴ ............................ F24F 7/00; F24F 13/00
[52] U.S. Cl. .................................. 98/42.07; 98/42.13; 98/78; 98/79
[58] Field of Search ................. 98/42.02, 42.07, 42.13, 98/78, 79, 83, 42.09, 42.12, 42.23

[56] References Cited

U.S. PATENT DOCUMENTS

| | | | |
|---|---|---|---|
| 464,204 | 12/1891 | Sugg | 98/79 X |
| 1,934,998 | 11/1933 | Stahlknecht | 98/78 X |
| 3,149,553 | 9/1964 | Solzman | 98/42.13 X |
| 3,306,179 | 2/1967 | Lambie et al. | 98/42.13 X |
| 3,382,792 | 5/1968 | Howard | 98/78 |

FOREIGN PATENT DOCUMENTS

| | | | |
|---|---|---|---|
| 1018625 | 1/1953 | France | 98/42.13 |
| 819012 | 8/1959 | United Kingdom | 98/42.07 |

Primary Examiner—Lloyd L. King
Attorney, Agent, or Firm—Kokjer, Kircher, Bradley, Wharton, Bowman & Johnson

[57] ABSTRACT

A wind diverter for deflecting incoming wind away from the discharge end of a ventilator fan of the type which ventilates agricultural buildings. The diverter includes a conical wind deflector which is mounted to an exhaust hood of the fan by rigid brackets. The deflector is in line with the exhaust hood and spaced away from its discharge end to permit exhaust of air from the hood. Incoming wind is deflected past the periphery of the deflector to create a low pressure region which assists the discharge of air from the exhaust hood.

7 Claims, 1 Drawing Sheet

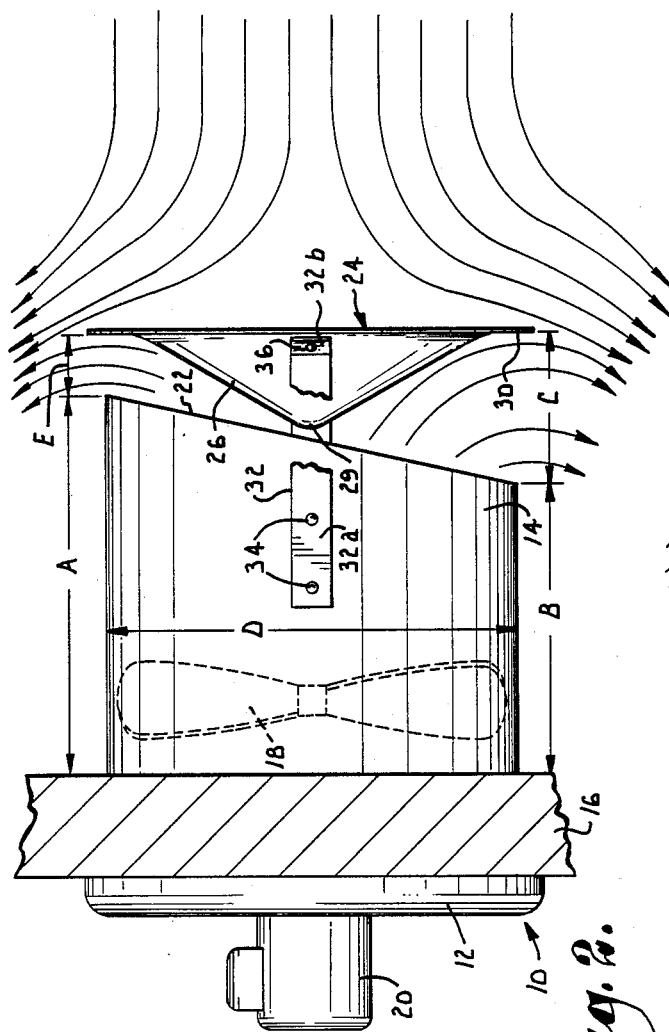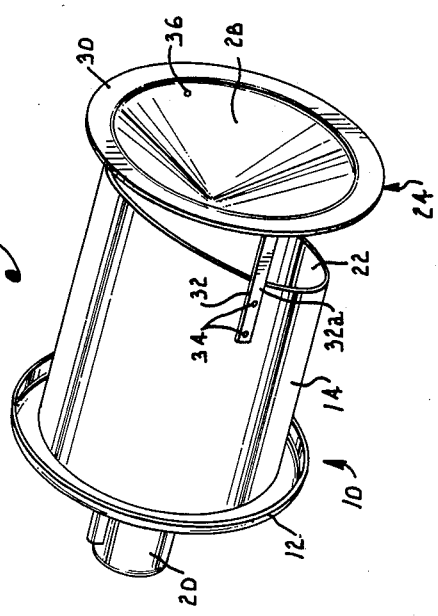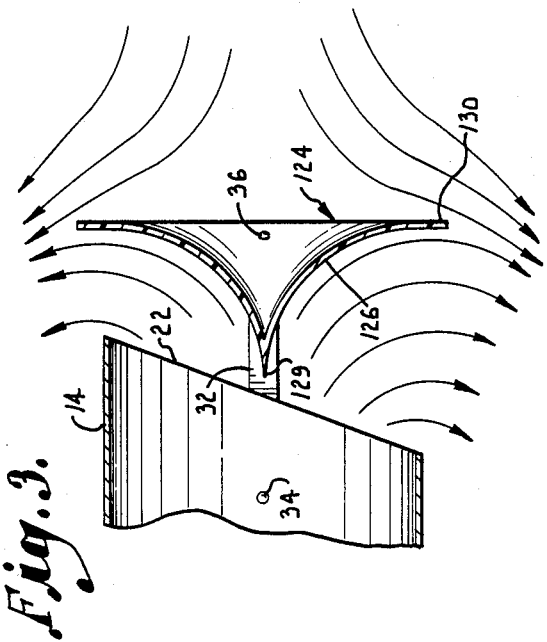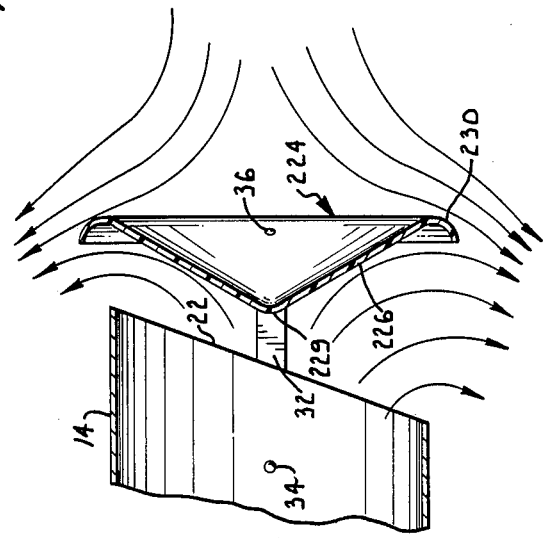

WIND DIVERTER FOR VENTILATOR FANS

This is a continuation of co-pending application Ser. No. 734,046 filed on May 10, 1985, now abandoned.

BACKGROUND AND SUMMARY OF THE INVENTION

This invention relates generally to ventilator fans and more particularly to a wind diverter which reduces the adverse effects of wind blowing toward the exhaust hood of a ventilator fan.

Agricultural buildings such as poultry sheds and hog sheds are commonly equipped with ventilation fans which provide the necessary ventilation for the building. Normally, the fan is mounted on a building wall and exhausts air from the building at a rate determined by the fan capacity. In order to protect the fan from ice, snow, rain and other potentially damaging effects, an exhaust hood is often mounted on the discharge side of the fan. The exhaust hood extends outwardly from the building wall and shields the fan from the elements.

If the fan exhausts directly into the wind, its efficiency is severely reduced. Consequently, it is common practice to amount the fan on a wall which faces east or south in order to avoid discharging into the normally prevailing west to east or north to south winds. However, it is not always possible to use an east or south facing wall for the fan, and the fan must occasionally be mounted on a west or north wall where it often faces into the impinging wind. Furthermore, the wind at times blows in all directions and thus sometimes opposes the fan regardless of its location or orientation. At best, winds which oppose the fan create back pressure on the fan blades or shutters which severely reduces the fan capacity and efficiency. At worst, the fan is completely stalled by the back pressure created by strong opposing winds. In cases where the building is used for animal or poultry confinement, the health of the animals confined in the building can be adversely affected if unfavorable wind conditions prevent adequate ventilation.

To my knowledge, there have been no special hoods or other structures available in the past which effectively shield the fan exhaust from wind pressure. Therefore, it is evident that a need exists for a device to prevent impinging winds from stopping or reducing the capacity of an exhaust fan. It is the primary goal of the present invention to meet that need.

More specifically, it is an object of the invention to provide a wind diverter which acts to deflect incoming wind away from the discharge end of the exhaust hood in order to prevent the wind from creating back pressure which could stall the exhaust fan or significantly reduce its operating capacity and efficiency.

Another object of the invention is to provide a wind diverter which does not interfer with normal operation of the ventilator fan in exhausting air from the building. The diverter actually enhances the fan exhaust because it deflects the wind in a manner to create a low pressure region adjacent to the discharge end of the exhaust hood, and the low pressure assists fan induced air flow out of the hood. Thus, in addition to preventing the wind from adversely affecting the fan, the diverter actually enhances the fan operation by assisting the discharge of air from the exhaust hood.

A further object of the invention is to provide a wind diverter of the character described which can be applied to virtually any exhaust hood and which can be installed either as original equipment or retrofitted to an existing fan that is already in place on an agricultural building.

An additional object of the invention is to provide a wind diverter of the character described which has a special aerodynamic shape for enhanced efficiency both in deflecting the incoming wind and in assisting the fan exhaust. The wind deflector preferably has a conical configuration which minimizes interference with the exhaust fan discharge while at the same time diverting the incoming wind in a pattern which prevents the wind from applying significant back pressure to the fan.

A still further object of the invention is to provide, in a wind diverter of the character described, a simple and economical mounting bracket system for securely attaching the deflector to the exhaust hood.

Yet another object of the invention is to provide a wind diverter of the character described which is constructed in a simple and economical manner and which uses materials that are resistant to the corrosive gases and liquids prevalent in the exhaust air from total confinement buildings.

Other and further objects of the invention, together with the features of novelty appurtenant thereto, will appear in the course of the following description.

DETAILED DESCRIPTION OF THE INVENTION

In the accompanying drawing which forms a part of the specification and is to be read in conjunction therewith and in which like reference numerals are used to indicate like parts in the various views;

FIG. 1 is a perspective view of a ventilation fan and exhaust hood equipped with a wind diverter constructed according to a preferred embodiment of the present invention;

FIG. 2 is a side elevational view showing the unit of FIG. 1 mounted on a vertical wall, with a portion broken away for purposes of illustration and the directional arrows indicating the flow pattern of the wind and the exhaust air;

FIG. 3 is a fragmentary sectional view similar to FIG. 2, but showing an alternative embodiment of the wind diverter, with the directional arrows indicating the air flow pattern; and FIG. 4 is a fragmentary sectional view similar to FIG. 3, but showing still another modified embodiment of the wind diverter, with the directional arrows indicating the air flow pattern.

Referring now to the drawing in more detail and initially to FIGS. 1 and 2, numeral 10 generally designates a ventilation fan assembly of the type commonly used to ventilate agricultural buildings such as hog sheds and poultry sheds. The fan assembly 10 includes a flange 12 from which a generally cylindrical exhaust hood 14 extends. The flange 12 can be bolted or otherwise secured to a vertical wall 16 of the building with the exhaust hood 14 projecting through an opening in the building and extending outwardly well beyond the wall 16. A fan 18 is mounted within the exhaust hood 14 and is driven by a fractional horse power electric motor 20. The inlet side of the ventilation fan communicates with the interior of the building, and the exhaust side of the fan discharges air into the exhaust hood 14 which in turn exhausts the air to the outside. The exhaust hood 14 has an open discharge end 22 which is inclined such that its upper portion overhangs its lower porton. The purpose for the exhaust hood 14 is to shield the fan from snow, ice, rain and other weather related effects.

Normally, the wall 16 to which the fan is mounted faces to the east or to the south so that the prevailing west to east and north to south winds do not directly impinge on the discharge end 22 of the exhaust hood 14. However, east and south facing walls are not always available, and the wall 16 can at times face to the west or north such that the prevailing winds blow directly toward the discharge end 22 of the hood. In addition, even when the wall 16 faces to the east or south, the wind at times blows directly toward the outlet end 22.

The wind diverter of the present invention reduces the adverse effects of incoming wind through the use of a wind deflector which is generally designated by numeral 24. The wind deflector 24 preferably has a generally conical shape and includes a conical wall 26. Within the wall 26, a cup shaped cavity 28 is formed and faces outwardly. The conical wall 26 preferably has a rounded tip 29 which is located on the axis of the cylindrical exhaust hood 14 and points toward the discharge end 22 of the hood. A flat flange 30 is formed on the periphery of the base or outer edge of the conical wall 26. The flange 30 occupies a vertical plane when the wind deflector is installed on the exhaust hood 14, and the flange has a diameter that is preferably about 1" greater than the diameter of the hood 14. The cone angle defined by the deflector wall 26 is preferably about 120°, although other angles are possible.

The deflector 24 is formed from a suitable material which is resistant to the corrosive gases and liquids normally prevalent in the exhaust air from total confinement buildings. The material should also be capable of withstanding temperature variations from −40° F. to 120° F. without cracking or otherwise deforming. Fiberglass reinforced polyester resin is a suitable material, as are various plastics such as polyvinyl chloride, polypropylene and the like. Metals such as aluminum and stainless steel can also be used. Steel which is coated with a suitable weather resistant coating is also suitable.

The wind deflector 24 is mounted on the exhaust hood 14 by a pair of identical mounting brackets 32. The brackets 32 locate the deflector outwardly from the discharge end 22 and directly in line with the exhaust hood. The brackets are preferably formed from aluminum, stainless steel or steel which is coated with a weather resistant coating. Each bracket has a straight arm portion 32a and a tab 32b bent outwardly on the outer end of the arm 32a. A pair of fasteners 34 are used to rigidly attach each arm 32a to the outside surface of the exhaust hood 14. The brackets are diametrically opposed to one another on opposite sides on the hood 14 with the arms 32a parallel to one another and extending horizontally beyond the discharge end 22 of the hood. Each tab 32b is bent at an angle that conforms with the shape of the conical deflector wall 26. Each tab 32b is rigidly connected to wall 26 by a suitable fastener 36. The fasteners 34 and 36 can be nuts and bolts.

In use, the wind diverter serves to deflect incoming wind and prevent it from impinging directly on the discharge end 22 of the exhaust hood. The incoming wind is diverted or deflected outwardly in all directions by the wind deflector 24, as indicated by the directional arrows in FIG. 2. The presence of the cup shaped cavity 28 in the outer face of the wind deflector assists in maintaining a laminar flow of the incoming wind and prevents turbulence which can create undesirable air flow patterns. Deflection of the wind past the periphery of the flange 30 creates a reduction in the pressure at the periphery of the flange, and this pressure reduction induces air to flow out of the discharge end 22 of the exhaust hood 14. Consequently, in addition to preventing the impinging wind from creating a significant back pressure on the fan, the wind deflector actually assists in exhausting air from the hood 14. The overall result is that the wind does not significantly reduce either the capacity of the operating efficiency of the fan, even when it flows directly toward the exhaust hood.

The wind deflector 24 also avoids undue interference with the normal flow of exhaust air created by the operation of the ventilation fan. The deflector 24 is spaced outwardly beyond the exhaust hood discharge end 22 and is located directly in line with the hood 14 and the exhaust air that passes through the hood. The conical wall 26 presents a concave surface which is aerodynamically efficient and permits the exhaust air to flow in all directions to prevent significant restriction of the flow of exhaust air out of the hood.

When the wind deflector 24 is installed, it is carefully located to avoid unduly restricting the area of the space through which the exhaust air is discharged from the hood 14. The area of the discharge space presented between the outlet end 22 of the hood and the flange 30 of the wind deflector should be substantially equal to the effective area of the discharge end 22.

With particular reference to FIG. 2, the exhaust hood 14 has a length A from the wall 16 to the top or outermost portion of the discharge end 22 and a length B from the wall to the lower portion of the discharge end. C represents the distance from the flange 30 to the lower portion of the discharge opening, while E represents the distance from the flange 30 to the top portion of the exhaust hood. If D is the diameter of the exhaust hood, the effective area of the discharge end 22 is $\pi D^2/4$. The area of the discharge space presented between flange 30 and the discharge end 22 of the exhaust hood is $\pi D[E+(A-B)/2]$. Equating the two areas to one another provides a solution of E of: $E=D/4-(A-B)/2$. From the geometry, the distance C is given by $C=E+A-B$. Thus, the wind deflector 24 should be mounted such that the dimensions C and E are at least equal to the expressions given above. Otherwise, the discharge area for exhaust air will be restricted in comparison to the effective area provided by the discharge end 22.

By way of example, for a 12 inch diameter fan, the exhaust hood diameter D is equal to approximately 13 inches, and typical values for A and B are 15 inches and 12 inches, respectively. From the equations given above, the dimension E should be at least 1¾ inches and the dimension C should be at least 4¾ inches.

The wind diverter 24 can be factory installed as original equipment mounted on the exhaust hood 14. Alternatively, the wind diverter can be retrofitted on an exhaust hood that is already installed on an agricultural building. In either case, the brackets 32 provide a simple mounting arrangement for the wind diverter while at the same time holding it rigidly in place at the proper location.

FIG. 3 shows an alternative embodiment of the wind deflector which is generally designated by numeral 124. The wind deflector 124 differs from the previously described embodiment in that it has the shape of a "needlepoint cone" having a wall 126 which is gradually curved as it extends from the tip 129 to the peripheral flange 130. The wall 126 flares outwardly in bell mouth fashion and its outer surface is a smoothly curved, concave surface. The shape of the wind deflector 124 creates a somewhat modified air flow pattern, as shown by the directional arrows in FIG. 3, and the modified air flow pattern is more desirable in some cases. The wind deflector 124 is mounted in the same manner as the wind deflector 24, and its location and orientation relative to the exhaust hood are likewise the same as previously described.

FIG. 4 illustrates yet another embodiment of the wind diverter 224 which differs from the wind deflector 24 only in that in place of the flat flange 30, deflector 226 has a curved lip 230 on its periphery. The lip 230 presents an annular trough which faces toward the exhaust hood, and this configuration results in a modified air flow pattern which in some cases is a more desirable pattern.

It should be evident that the wind deflector can have various alternative configurations. Although it is desirable in most cases to provide a cup shaped cavity facing toward the incoming wind, such a cavity is not always necessary and it is possible for the wind deflector to have a substantially flat shape such as the shape of a flat circular plate oriented vertically or angled from the vertical.

From the foregoing, it will be seen that this invention is one well adapted to attain all the ends and objects hereinabove set forth together with other advantages which are obvious and which are inherent to the structure.

It will be understood that certain features and subcombinations are of utility and may be employed without reference to other features and subcombinations. This is contemplated by and is within the scope of the claims.

Since many possible embodiments may be made of the invention without departing from the scope thereof, it is to be understood that all matter herein set forth or shown in the accompanying drawings is to be interpreted as illustrative and not in a limiting sense.

Having thus described the invention, I claim:

1. An agricultural building for housing confined livestock which are adversely affected by substantial diminution from the flow of ventilation air from the building, said building having a vertically extending side wall, the exterior of said side wall being exposed to wind currents blowing horizontally at variable rates, there being an opening through said side wall
    ventilation means operably associated with said building for effecting a flow of ventilation air from the interior of the building at a substantially uniform rate to prevent adverse effects on livestock confined in the building, said ventilation means including means for conducting air from the building interior to the exterior through the opening in the side wall, said conducting means including a tubular, generally horizontally directed exhaust hood having an outlet opening disposed exteriorly of the building for discharge of said ventilation air through said outlet opening, and fan means operably associated with said conducting means for creating a flow of ventilation air through the conducting means and through said discharge opening; and
    a wind deflector disposed outboard of said discharge opening and extending substantially normal to the flow of air through said discharge opening in disposition to shield the latter from wind currents directed against said flow of ventilation air from the building to prevent said currents from diminishing the flow of ventilation air from the building, thereby protecting the livestock in the building.

2. The invention is claim 1, wherein said wind deflector is a generally conical member having a tip pointing substantially toward the center of the discharge end of the hood.

3. The invention of claim 2, wherein said conical member has a base and a generally flat peripheral flange on said base.

4. The invention of claim 2, wherein said conical member has a base and a curved wall which flares between said tip and base.

5. The invention of claim 2, wherein said conical member has a base and a curved lip on the periphery of the base.

6. The invention of claim 1, wherein said wind deflector has sufficient size to generally cover the outlet opening of the hood, said wind deflector being located to present a space between the discharge end of the exhaust hood and said wind deflector which is substantially equal to the effective area of said outlet opening.

7. A method of protecting livestock confined in an agricultural building by insuring a relatively constant flow of ventilation air from the interior of the building to the exterior thereof, said building being exposed to wind currents capable of blowing from any horizontal direction and at variable rates, said method comprising the steps of:
    establishing a flow of air at a substantially uniform rate from the interior of the building;
    discharging said flow of air in a horizontal path through a duct having a discharge opening outside the building; and
    deflecting said wind currents from impinging on the flow of air through the discharge opening to prevent diminution to the rate of flow of ventilation air from the building, said deflecting step being carried out by positioning a wind deflector in outwardly spaced relationship from said discharge opening and in position to deflect wind currents which are directed opposite the path of flow of said ventilation air at the discharge opening.

* * * * *